(12) United States Patent
Lytle

(10) Patent No.: US 8,029,674 B2
(45) Date of Patent: Oct. 4, 2011

(54) BIOLOGICAL FILTER FOR OXIDIZING AMMONIA IN DRINKING WATER TREATMENT

(75) Inventor: Darren Alan Lytle, Hamilton, OH (US)

(73) Assignee: The United States of America as represented by the Administrator of the Environmental Protection Agency, Washington, DC (US)

(*) Notice: Subject to any disclaimer, the term of this patent is extended or adjusted under 35 U.S.C. 154(b) by 96 days.

(21) Appl. No.: 12/457,107

(22) Filed: Jun. 1, 2009

(65) Prior Publication Data

US 2010/0300964 A1    Dec. 2, 2010

(51) Int. Cl.
*C02F 3/06* (2006.01)
(52) U.S. Cl. .................. 210/617; 210/620; 210/903
(58) Field of Classification Search .............. 210/615, 210/617, 150, 151, 903, 620
See application file for complete search history.

(56) References Cited

U.S. PATENT DOCUMENTS

| | | | | |
|---|---|---|---|---|
| 3,773,660 A * | 11/1973 | Hopwood | | 210/617 |
| 4,179,374 A * | 12/1979 | Savage et al. | | 210/151 |
| 4,696,747 A * | 9/1987 | Verstraete et al. | | 210/617 |
| 4,800,021 A * | 1/1989 | Desbos | | 210/150 |
| 5,019,268 A * | 5/1991 | Rogalla | | 210/617 |
| 5,525,230 A * | 6/1996 | Wrigley et al. | | 210/150 |
| 6,159,364 A * | 12/2000 | Hirane | | 210/150 |
| 6,413,427 B2 * | 7/2002 | Tipton et al. | | 210/617 |
| 7,022,233 B2 * | 4/2006 | Chen | | 210/151 |

* cited by examiner

*Primary Examiner* — Christopher Upton

(57) ABSTRACT

A process for treatment of water to convert ammonia to nitrate including: feeding water containing dissolved ammonia, as an influent introducing water to be treated, into a packed column containing filter media as packing; introducing air through a diffuser at the bottom of the packed column to maintain the water saturated with oxygen throughout the packed column; establishing colonies of bacteria converting ammonia to nitrate within the column; and removing an ammonia-free and nitrite-fee effluent from the column.

20 Claims, 2 Drawing Sheets

BIOLOGICAL FILTER FOR OXIDIZING AMMONIA IN DRINKING WATER TREATMENT

BACKGROUND OF THE INVENTION

1. Field of the Invention

The present invention relates to the field of drinking water treatment and, more specifically, to the removal of ammonia from drinking water.

2. The Prior Art

Ammonia occurs naturally in some groundwater, or is added to water to form chloramines in drinking water distribution systems. Research on the presence of ammonia in drinking water distribution systems has suggested some correlation between excess ammonia and increased biological activity (Servais et al. 1995; Wilezak et al. 1996) and adverse effects on water's taste and odor (Bouwer and Crowe 1988; Rittmann and Huck 1989).

Chloramines (a combination of ammonia and chlorine) are commonly used as disinfectants in the water treatment process in place of free chlorine because they produce lower levels of disinfection by-products such as trihalomethanes, haloacetic acids, and other halogenated organic compounds, which are potentially carcinogenic or mutagenic. Free ammonia is produced when chloramines break down within the distribution system (Vikesland et al. 2001) and when excess ammonia relative to chlorine is added in the chloramine production process.

The oxidation of ammonia to nitrite, and then nitrate, is a biological process referred to as nitrification. When nitrification occurs uncontrolled in drinking water distribution systems, the biological stability of the distribution system is disrupted, which can cause a number of water quality problems (Rittmann and Snoeyink 1984). The autorophic bacteria responsible for nitrification are abundant in many source waters and can grow readily in distribution systems if ammonia and oxygen substrates are available. The occurrence of nitrification in distribution systems is common and has been will-documented (Rittmann and Snoeyink 1984; Odell et al. 1996; Fleming et al. 2005). The growth of nitrifying bacteria in distribution systems can cause a number of problems. For example, biological activity has been shown to promote corrosion of some metals (Bremer and Wells 2001; Lee et al. 1980). In the case of nitrifying bacteria, the corresponding pH drop associated with the biological oxidation of ammonia directly impacts corrosion of distribution system materials.

In addition, the nitrifying bacteria support the development of undesirable heterotrophic bio-films by supplying organic carbon substrates. These biofilms produce metabolic byproducts that adversely affect the taste and odor of the water (Suffet et al. 1996). Incomplete nitrification of ammonia can result in increased levels of toxic nitrite ($NO_2$). Because the United States Environmental Protection Agency's (U.S. EPA) maximum contaminant levels ($MCL_s$) apply at the entry point into the distribution system, rather than within the distribution system, monitoring of contaminants such as nitrite and nitrate are normally not conducted at the consumer's tap. If nitrification resulting from elevated ammonia levels in the source water occurs in the distribution system, elevated and potentially dangerous levels of nitrite and nitrate can form and go unnoticed.

Many regions in the United States have excessive levels of ammonia in their source waters. For example, farming and agriculture in the Midwest contribute to relatively high levels of ammonia in many ground waters. Although ammonia in water does not pose a direct health concern, nitrification of significant amounts of excessive ammonia may. In addition, ammonia in arsenic bearing waters, for example, may negatively impact arsenic removal by creating a chlorine demand and reducing the chlorine's availability for oxidation of arsenic. Clearly, the complete oxidation of excess source water ammonia during the treatment process reduces the potential negative impact (nitrification) on distribution system water quality. While physicochemical methods for ammonia removal, such as ion exchange, are able to remove ammonia to varying degrees, biological approaches may be the most efficient and cost-effective.

Biologically-active filtration has been used successfully for addressing reduction of some contaminants in Europe for years. Bouwer and Crowe (1988) documented the use of various biological methods throughout Great Britain, France, and Germany, including fluidized beds, rapid sand filters, biologically active granulated active carbon (GAC), and soil-aquifer treatment. However, the use of biologically active filtration to oxidize ammonia as a full-scale drinking water treatment process has not been adopted in the United States because number of concerns including the potential release of excessive numbers of bacteria into finished waters, sensitivity of bacteria to changes in water chemistry and operating conditions, and a lack of long term documentation of the effectiveness and reliability of biological water treatment processes. Biological oxidation of ammonia requires oxygen to convert ammonia to nitrate. Many waters contain ammonia levels requiring greater levels of oxygen than can be introduced through accepted processes. The result is incomplete oxidation of ammonia and elevated levels of nitrite. Nitrite is more toxic than nitrate to humans and subsequently is regulated at a lower level (1 mg N/L) than nitrate (10 mg N/L), "N/L" meaning "as nitrogen, per liter."

SUMMARY OF THE INVENTION

The present invention combines aeration and biological filtration in a unique way to oxidize excessive levels of ammonia in drinking water while avoiding nitrification in the distribution system and other problems associated with the presence of ammonia.

In waters containing excessive levels of ammonia, the ability to completely oxidize ammonia to nitrate is limited by the availability of oxygen that can be supplied to the system. Biological conversion of ammonia ($NH_3$) to nitrate ($NO_3$) involves a two-step sequence of reactions mediated by two different genera of bacteria, *Nitrosomonas* and *Nitrobacter* which are naturally present in ammonia-containing waters. These autotrophic bacteria derive energy for cellular functions from the oxidation of ammonia and nitrite, respectively, and require oxygen to complete the reactions. *Nitrosomonas* are responsible for the oxidation of ammonia, in the form of ammonium ($NH_4^+$), to nitrite ($NO_2$) according to the reaction:

$$NH_4^+ + 1.5\, O_2 \rightarrow NO_2^- \rightarrow H_2O + 2H^+ \quad (1)$$

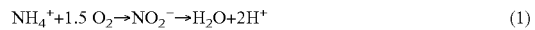

*Nitrobacter* or *Nitrospira* (depending on environment) subsequently oxidize nitrite to nitrate, as follows:

$$NO_2^- + 0.5\, O_2 \rightarrow NO_3^- \quad (2)$$

By summing these equations, the overall nitrification reaction is obtained:

$$NH_4^+ + 2\, O_2 \rightarrow NO_3^- + 2\, H^+ + H_2O \quad (3)$$

The above are net reactions involving a complex series of enzyme-catalyzed intermediate steps. From equation (3), it is clear that nitrification produces free protons, which readily consume available bicarbonate ions ($HCO_3$), thereby reducing the buffering capacity of the water. The consumption of alkalinity (as $C_aCO_3$) by nitrification is 7.14 mg/mg $NH_4^+$—N oxidized. For complete nitrification, 4.57 mg $O_2$ is required per mg $NH_4^+$—N (as N) oxidized.

Nitrifying bacteria, specifically including both *Nitrosomonas* and *Nitrobacter* (or *Nitiospira*) genera, may be established as colonies growing on the filter media by seeding with media from any filter which has been in service in the treatment of ammonia-containing water for an extended period of time, e.g. at least 50 days. However, as noted above, nitrifying bacteria occur naturally in ammonia-containing water and, accordingly, the nitrifying bacteria may be established on the filter media simply by running the ammonia-containing water through a packed column for a period of time (50 days or more) sufficient to establish bacterial colonies sufficiently large to convert essentially all the ammonia in the feed to the packed column into nitrate.

Accordingly, the present invention provides a process for treatment of water to convert ammonia to nitrate comprising introducing water to be treated, containing dissolved ammonia, as an influent into a packed column containing filter media as packing; introducing air through a diffuser at the bottom of the packed column to maintain the water saturated with oxygen throughout the packed column; establishing colonies of bacteria converting ammonia to nitrate within the column; and removing an ammonia-free and nitrite-free effluent from the column.

As found experimentally in the pilot plant tests described below, the air introduced into the bottom of the column strips dissolved $CO_2$ from the water making the pH of the effluent significantly higher than that of the influent, e.g. from 5-7 for the influent to 8-10 for the effluent.

In the preferred embodiments, air is introduced into the bottom of the packed column for flow co-current with the diffused air rising through the columns. While counter-current flow may also be used, co-current flow is preferred because experimentation has shown that co-current flow better avoids clogging of the packed bed of filter media.

Preferably, the filter loading rate is from about 1.2 gpm/ft² to 2.2 gpm/ft² and the effective time of contact between the water undergoing treatment and the column packing is 10-20 minutes.

DESCRIPTION OF THE PREFERRED EMBODIMENTS

Figure 1:
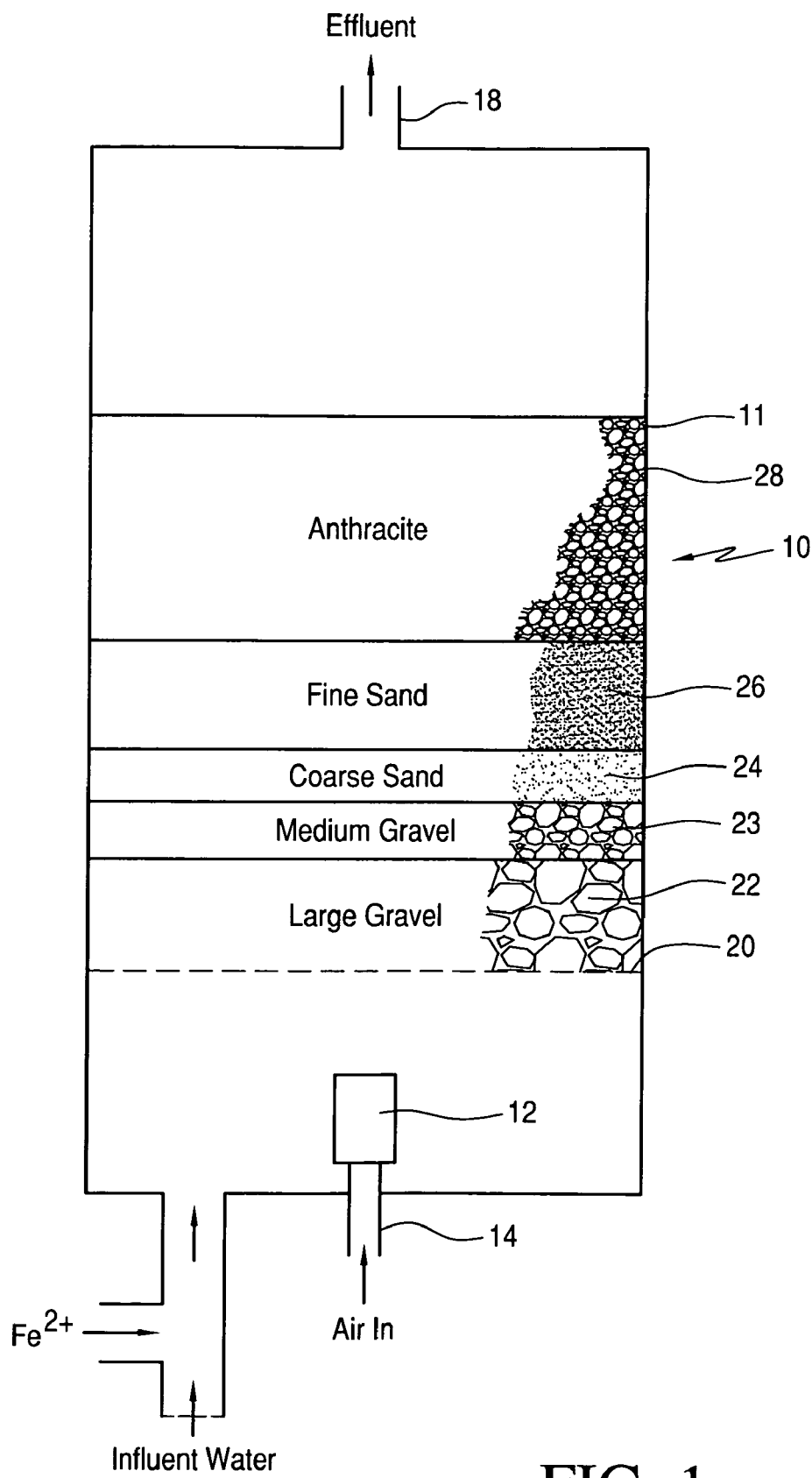
FIG. 1 is a schematic view of a packed column which may be used in the process of the present invention.

FIG. 1 shows a packed column (filter) 10 as used in the experimental pilot plant work described below. The filter 10 included an 8-foot, 2 inch diameter, transparent glass column 11.

The pilot filters were designed and operated considering various factors such as type of replacement media, media depth, filter loading rate, filter backwash frequency, etc. From bottom to top, the media consisted of, within five zones supported on a grid 20, 4 inches of large gravel 22 (effective size of 0.5-1.0 inch), 4 inches of medium gravel 23 (effective size of 0.25-0.5 inch), 4 inches of coarse sand 24 (effective size of 0.97 mm), 10 inches of fine sand 26 (effective size of 0.44 mm), and 20 inches of anthracite 28 (effective size of 0.97 mm). The column 10 was fed with test water directly through a PVC pipe 14 at a loading rate of 2 gpm/ft². Initially, the filter columns 10 were seeded with nitrifying bacteria.

The depth of the layers can vary widely depending on factors including water quality. For example, the presence of excessive iron in the water or excessive numbers of bacteria would favor the use of gravel rather than sand to avoid clogging issues. It is recommended that pilot testing be performed to evaluate the specific media designations for a specific water to be treated.

Figure 2:
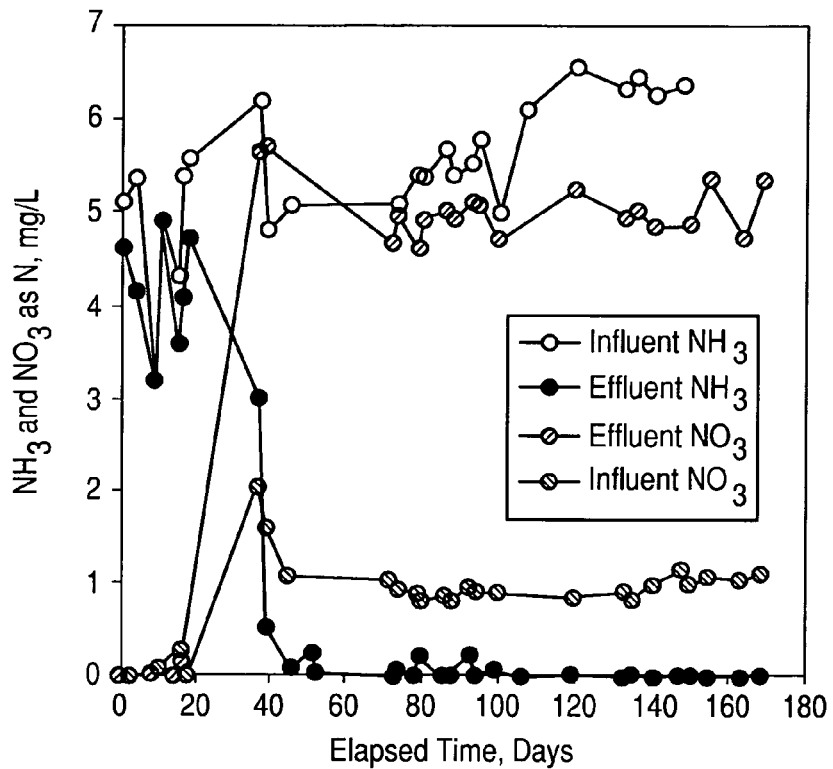
FIG. 2 is a graph of ammonia and nitrate levels in the influent and effluent to/from the packed column versus elapsed days of operation.

The diffuser 12, e.g. a porous sandstone diffuser, bubbles air (oxygen) through the filter while ammonia-containing water is passed through the filter, co-current in this embodiment. As water passes through a new filter 10, bacteria attaches to the media and the bacteria are sustained by the oxygen introduced through the bubble diffuser 12. The water in the filter column is maintained saturated with oxygen, throughout the entire column. As a result, there is no restriction on the amount of ammonia in the source water that can be treated and incomplete oxidation of ammonia (formation of nitrite) is avoided. In this pilot plant experiment, the water introduced into the columns contained 5 mg N/L ammonia (5 mg nitrogen, as ammonia, per liter). Tests showed that within 50 days all ammonia entering the filter 10 was converted to the first oxidation state, nitrite (FIG. 2). The relatively fast response (the device was only operated 18 hours per day, 5 days a week) and ability to transfer bacteria effectively from one medium to the next indicates that nitrifying bacteria are robust and capable of living in dynamic environments.

As air is pumped into the diffuser, it is disseminated in the column in the form of small bubbles which travel up through the filter and replenish oxygen used during nitrification. 5 mg $NH_3$ as N/L, 1 mg/L $Fe^{2+}$, and 50 µ/L $As^{3+}$ were added to batches of dechlorinated Cincinnati tap water which were prepared daily in a 55 gallon drum. The filter was run 18 hours per day at 1.6 GPM/ft². On a daily basis, the influent and effluent from the column were sampled for ammonia nitrogen, nitrate nitrogen, pH, and dissolved oxygen. Also, the head loss and flow rate of the column was recorded daily. The system operation can be modified with respect to filter media size and filtration loading rate to optimize ammonia oxidation. Also, tests have demonstrated that the water flow can be either co-current or countercurrent to the air flow, depending on water quality.

Figure 3:
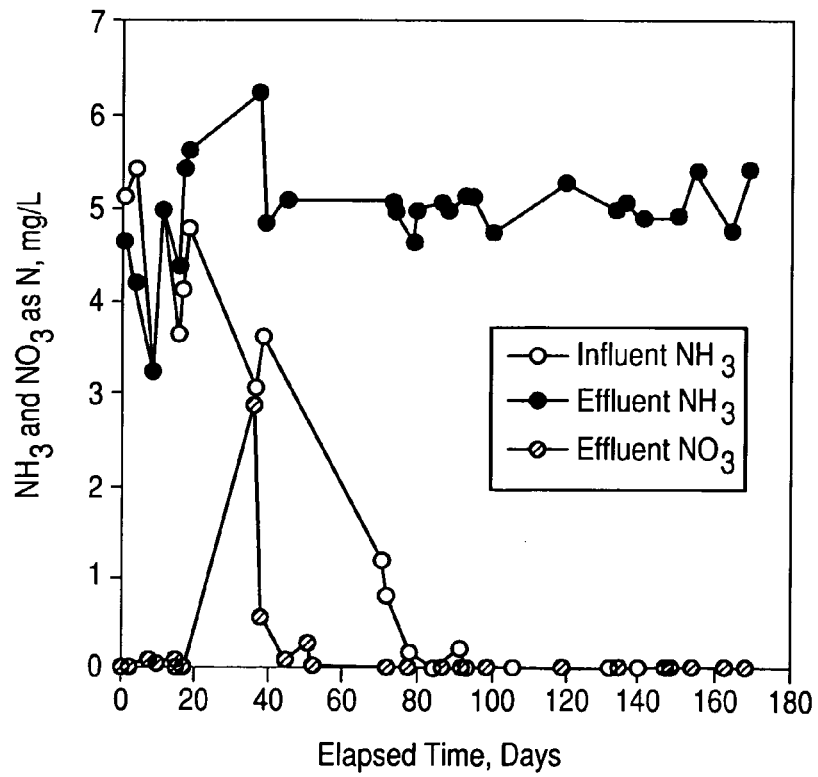
FIG. 3 is a graph of ammonia and nitrite levels in the influent and effluent to/from the packed column versus elapsed days of operation.

FIG. 2 shows that, as the bacteria acclimate and grow in the filter, filter effluent ammonia levels quickly drop off (between 20 to 50 days). During the same time period, nitrate (the oxidized product) increases. Once the filter is biologically established (beyond 50 days), the process operates consistently (i.e., all ammonia is oxidized to nitrate) and requires very little attention. High nitrite concentrations encourage the growth of nitrite oxidizing bacteria and within 90 days after the study began, all nitrite generated within the filter was oxidized further to nitrate (FIG. 3). Since the amount of nitrate generated through the biological nitrification process can never be greater than the amount of ammonia which was in the source water, elevated nitrate levels should not be a concern as long as free ammonia levels are below about 10 mg/L as N in source water. And more importantly, complications at the treatment plant and in the distribution system associated with nitrification are eliminated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A process for treatment of water to convert ammonia to nitrate comprising:
    introducing water to be treated, containing dissolved ammonia, as an influent into a packed column containing filter media as packing;
    introducing air through a diffuser at the bottom of the packed column to maintain the water saturated with oxygen throughout the packed column;
    establishing colonies of bacteria converting ammonia to nitrate within the column; and
    removing an ammonia-free and nitrite-free water as effluent from the column.

2. A process according to claim 1 wherein the influent water is introduced into the bottom of the packed column for flow co-current with the air.

3. A process according to claim 1 wherein the air introduced into the bottom of the column strips dissolved carbon dioxide from the water influent to give the effluent a pH which is substantially higher than the pH of the influent water.

4. A process according to claim 1 wherein the effective time of contact between the water undergoing treatment and the packed bed is 10 to 20 minutes.

5. A process according to claim 1 wherein the filter loading rate is about 1.2 to 2.2 gpm/ft$^2$.

6. The process for treatment of water according to claim 1, further comprising:
    testing the water to be treated for water quality; and
    varying the depth of the filter media depending on the water quality.

7. The process for treatment of water according to claim 1, wherein the establishing of colonies of bacteria occurs by initially seeding the filter media with nitrifying bacteria.

8. The process for treatment of water according to claim 1, wherein the bacteria used within the column are naturally present in drinking water.

9. The process for treatment of water according to claim 1, wherein the filter media has at least five zones.

10. The process for treatment of water according to claim 9, wherein the five zones comprise large gravel, medium gravel, coarse sand, fine sand, and anthracite.

11. The process for treatment of water according to claim 1, further comprising adding iron to the introduced water to be treated.

12. A process for treatment of water to convert ammonia to nitrate comprising:
    introducing drinkable water to be treated, containing excessive amounts of dissolved ammonia, as an influent into a packed column containing five zones of filter media as packing, wherein the introduced water is fed at a loading rate of about 1.2 to 2.2 gpm/ft$^2$;
    introducing air through a diffuser at the bottom of the packed column to maintain the water saturated with oxygen throughout the packed column;
    stripping dissolved carbon dioxide from the water influent to give an effluent of the column a pH which is substantially higher than the pH of the water influent;
    initially seeding colonies of nitrifying bacteria to convert ammonia to nitrate on the filter media within the column;
    removing an ammonia-free and nitrite-free water as the effluent from the column; and
    using the removed ammonia-free and nitrite-free water as drinking water.

13. A process according to claim 12 wherein the influent water is introduced into the bottom of the packed column for flow co-current with the air.

14. The process for treatment of water of claim 13, further comprising adding iron to the introduced drinkable water to be treated.

15. The process for treatment of water of claim 14, further comprising contacting the water with the packed column for 10-20 minutes.

16. The process for treatment of water according to claim 15, wherein the five zones comprise large gravel, medium gravel, coarse sand, fine sand, and anthracite.

17. A process for treatment of water to convert ammonia to nitrate comprising:
    packing a column with at least five zones of filter media, wherein the filter media comprises four inches of large gravel, four inches of medium gravel, four inches of coarse sand, ten inches of fine sand, and twenty inches of anthracite;
    establishing colonies of bacteria converting ammonia to nitrate within the column;
    introducing drinkable water to be treated, containing dissolved ammonia, as an influent into the packed column containing at least five zones of filter media;
    introducing air through a diffuser at the bottom of the packed column to maintain the water saturated with oxygen throughout the packed column;
    contacting the influent water with the packed column for 10-20 minutes;
    stripping dissolved carbon dioxide from the water influent to give an effluent of the column a pH which is substantially higher than the pH of the water influent;
    removing an ammonia-free and nitrite-free water as the effluent from the column; and
    using the removed ammonia-free and nitrite-free effluent water as drinking water.

18. The process for treatment of water of claim 17, further comprising adding iron to the introduced drinkable water to be treated.

19. The process for treatment of water according to claim 17, wherein the establishing of colonies of bacteria occurs by initially seeding the filter media with nitrifying bacteria.

20. A process according to claim 17 wherein the influent drinkable water is introduced into the bottom of the packed column for flow co-current with the air.

* * * * *